(12) United States Patent
Shimada

(10) Patent No.: US 6,247,051 B1
(45) Date of Patent: Jun. 12, 2001

(54) HIGH SPEED TRANSFER OF FAILURE INFORMATION IN AN ATM NETWORK

(75) Inventor: Naohiro Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/948,609

(22) Filed: Oct. 10, 1997

(30) Foreign Application Priority Data

Oct. 11, 1996 (JP) .................................................. 8-270082
Apr. 7, 1997 (JP) .................................................. 9-087845

(51) Int. Cl.$^7$ ...................................................... G06F 11/30
(52) U.S. Cl. ............................................ 709/224; 709/224
(58) Field of Search ....................... 709/224; 395/200.54; 370/242, 216, 397, 399

(56) References Cited

U.S. PATENT DOCUMENTS

| | | | |
|---|---|---|---|
| 5,321,688 | * 6/1994 | Nakano et al. | 370/244 |
| 5,394,408 | 2/1995 | Nishihara et al. | 714/812 |
| 5,475,696 | * 12/1995 | Taniguchi | 714/775 |
| 5,600,630 | * 2/1997 | Takano et al. | 370/218 |
| 5,712,853 | * 1/1998 | Mathur et al. | 370/467 |
| 5,737,312 | * 4/1998 | Sasagawa | 370/232 |
| 5,764,624 | * 6/1998 | Endo et al. | 370/218 |
| 5,831,973 | * 11/1998 | Yokotani et al. | 370/236 |
| 5,864,555 | * 1/1999 | Mathur et al. | 370/395 |
| 5,872,770 | * 2/1999 | Park et al. | 370/249 |
| 6,058,114 | * 5/2000 | Sethuram et al. | 370/397 |
| 6,163,529 | * 12/2000 | Nagel et al. | 370/244 |

FOREIGN PATENT DOCUMENTS

| | | |
|---|---|---|
| 40485/95 | 6/1996 | (AU) . |
| 0 671 827 A2 | 9/1995 | (EP) . |
| 4-157942 | 5/1992 | (JP) . |
| 4-287539 | 10/1992 | (JP) . |
| 5-235983 | 9/1993 | (JP) . |

OTHER PUBLICATIONS

Pierre Cregut et al.; A Protocol for Supporting the ABT/DT Capability; Proc. 1996 Int'l Conf. on Network Protocols; pp. 218–225, Nov. 1996.*

Hiroyuki Saito et al.; An Improved Guided Restoration Algorithm for ATM Corconnect Networks; IEEE Network Operations and Management Symposium; pp. 225–234, Apr. 1996.*

Naohiro Shimada et al.; Bandwidth—Adaptive VP Protection Using User Cells; IEEE International Conference on Communications; pp. 617–622, Jun. 1998.*

Thomas M. Chen et al.; Monitoring and Control a ATM Networks Using Special Cells; IEEE Network; pp. 28–38, Sep. 1998.*

(List continued on next page.)

*Primary Examiner*—Kenneth R. Coulter
(74) *Attorney, Agent, or Firm*—Sughrue, Mion, Zinn, Macpeak & Seas, PLLC (57) ABSTRACT

In a node (14) which is for use in an ATM (asynchronous transfer mode) network and which is supplied with user cells, the node includes a failure detecting section (11) for detecting a failure which is occurred in the ATM network such that no user cell is supplied to the node. The node further includes a band detecting section (12) for detecting, as a detected band, a transmission path band used in transferring the user cells immediately before occurrence of the failure. Connected to the failure detecting section and the band detecting section, a producing section (13) produces, when the failure detecting means detects the failure, OAM (Operation: Administration and Maintenance) cells at a production rate increased within a range such that the detected band is not exceeded. The OAM cells are for use in transferring information indicative of occurrence of the failure.

2 Claims, 7 Drawing Sheets

EXAMPLE 1 OF VP AIS OUTPUT RATE ADJUSTMENT

OTHER PUBLICATIONS

Hiroyuki Fujii et al.; Restoration Message Transfer Mechanism and Restoration Characteristics of Double–Search Self–Healing ATM Network; IEEE Journal on Selected Areas in Communications; vol. 12, No. 1; pp. 149–158, Jan. 1994.*

"ATM Net Management: A Status Report," by Peter Alexander and Kasey Carpenter, dated Sep. 1995.

Dale Krisher, "ATM VP Fault Reconfiguration Proposal for Uni–Ring Networks", Alcatel Contribution to T1 SONET Rates and Formats Standards Project, T1X1.5/96–044, Mar. 1996, pp. 1–18.

Dale Krisher, "New Function Type Indetifier for ATM Link Status Cells", Alcatel Contribution to T1 SONET Rates and Formats Standards Project, T1S1.5/96–087, Mar. 1996.

* cited by examiner

COMPARISON BETWEEN THE METHODS OF GIVING "1" AND "1 AND 0" TO CLP'S

"L" LOWERED IN PRIORITY AFTER REWRITING CLP
    (CELL OF CLP = 0 CHANGED TO CLP = 1)
"H" HEIGHTENED IN PRIORITY AFTER REWRITING CLP
    (CELL OF CLP = 1 CHANGED TO CLP = 0)
"U" UNCHANGED IN PRIORITY EVEN AFTER REWRITING CLP

1) METHOD OF GIVING 1 TO ALL CLP'S (TAGGING)

```
INPUT DATA SEQUENCE    000000000011110000000000000
AFTER CLP'S ARE
GIVEN 1                111111111111111111111111111
                       L L L L L L L L L L U U U U L L L L L L L L L L L L L

INPUT DATA SEQUENCE    111111111100001111111111111
AFTER CLP'S ARE
GIVEN 1                111111111111111111111111111
                       U U U U U U U U U U L L L L U U U U U U U U U U U U U
```

Thus, the "Method of Giving 1 to All CLP's" exclusively provides those "Unchanged in Priority even after Rewriting CLP" and those "Lowered in Priority after Rewriting CLP (Cell of CLP = 0 changed to CLP = 1)"

2) METHOD OF GIVING ALTERNATION OF 1 AND 0 TO CLP'S

```
INPUT DATA SEQUENCE    000000000011110000000000000
AFTER GIVEN 1 AND 0    101010101010101010101010101
                       L U L U L U L U L H U H U U L U L U L U L U L U L U

INPUT DATA SEQUENCE    111111111100001111111111111
AFTER GIVEN 1 AND 0    101010101010101010101010101
                       U H U H U H U H U U L U L H U H U H U H U H U H U H
```

Thus, in the "Method of Giving Alternation of 1 and 0 to CLP's", those lowered in priority after rewriting CLP (Cell of CLP = 0 changed to CLP = 1) are reduced as compared with the "Method of Giving 1 to CLP's". On the contrary, some of those "Unchanged in Priority even after Rewriting CLP" are turned into those "Heightened in Priority after Rewriting CLP (Cell of CLP = 1 changed to CLP = 0)".

FIG. 7

EXAMPLE OF APPLICATION TO UPSR

FIG. 8

EXAMPLE OF SWITCHING IN RESPONSE TO RATIO OF CLP = 1

HIGH SPEED TRANSFER OF FAILURE INFORMATION IN AN ATM NETWORK

BACKGROUND OF THE INVENTION

This invention relates to an ATM (Asynchronous Transfer Mode) signal switching apparatus and, in particular, to a switching reference in switching ATM virtual paths (VP's: Virtual Paths) and ATM virtual channels (VC's: Virtual Channels) in order to obtain high reliability for the ATM network formed by the signal switching apparatus. This invention relates also to a device and a method for transferring failure information as the switching reference in the ATM network.

For convenience of description, VP switching alone will be described hereinafter. VC switching is carried out in a manner similar to the VP switching.

In the prior art, the following methods are known.

(1) VP AIS (Alarm Indication Signal) Based Switching Method

Upon occurrence of a line failure, a path failure (for example, an STS-1 path failure), or a failure in a VP itself, a VP AIS is inserted downstream. At a receiving end, detection of the VP AIS is used as a i.e., switching reference (switching trigger).

The above-mentioned method is described also in T1.X1.5/96-044 Alcatel Contribution "ATM VP Uni-Ring Fault Reconfiguration". An AIS based switching method itself has been generally practiced in a SONET (Synchronous Optical Network). In this method, the path failure is transmitted via a Path AIS and the detection thereof is used as the switching trigger. A UPSR (Unidirectional Path Switched Ring) of the SONET adopts this method (GR-1400-CORE Issue 1, Bellcore March 1994).

(2) PM (Performance Monitoring) Based Switching Method

By PM carried out at a VP terminating point, the status of the VP is detected.

It is used as a switching reference (switching trigger). This method is also described in T1.X1.5/96-044 Alcatel Contribution"ATM VP Uni-Ring Fault Reconfiguration".

(3) Switching Message Based Switching Method

There is a method of switching in response to notification or delivery of a switching message. For example, in a SDH (Synchronous Digital Hierarchy) network, protection using K1 and K2 is widely used. As an application of the above-mentioned scheme to an ATM, there is a method of delivering the message by the use of OAH (Operation: Administration and Maintenance) cells.

JP-A No. 157942/1992 entitled "Fault Announcing Cell Generating Apparatus" discloses a method of regenerating fault announcing cells for notification. In T1.X1.5/96-044, T1X1.5/96-087, and T1S1.5/96-087, Alcatel contribution entitled "ATM VP Uni-Ring Fault Reconfiguration" a method of transmitting VP Segment Status/Link Status messages by the use of regenerated cells is proposed.

JP-A No. 235983/1993 entitled "Virtual Path Switching Apparatus and Switching Method" describes a technique of detecting a fault by path monitoring means, propagating a switching control signal on a spare channel to maintain a capacity, and thereafter performing the switching operation, although a practical propagation scheme is not described in detail.

JP-A No. 287539/1992 entitled "Alarm Transfer Method and Transfer System in an ATM Network" describes an alarm transfer method in which the failure is restricted to a link failure and all VPI's (Virtual Path Identifiers) accommodated in a link in question are dealt with. The VPI's are recognized from a VPI management table. For each of the VPI's, a cell containing alarm information is formed and delivered.

Problems in the switching operation triggered by the VP AIS are:

(1) It is difficult to insert the VP AIS for VP's up to 4096 at maximum (for VC's, much greater). In addition, insertion must simultaneously be carried out at a high speed.

(2) This means that new OAM cells are inserted. It is therefore necessary to newly assign the OAM cells to a transmission path band currently used. In those cases where user cells are completely lost, such as Line LOS (Loss of Signal), the insertion of the VP AIS as the OAM cells results in no problem. However, in those cases where the user cells are not lost, for example, in the case of B2 errors, the insertion of the VP AIS may suppress the band allotted to the user cells.

(3) The use of the OAM cells inevitably results in a disadvantage of slow message transmission. The insertion of the VP AIS requires at least 500 msec before the first insertion takes place. Subsequent insertion is carried out at a rate of 1 cell/1 second (GR-1248-CORE Issue 1, Bellcore August 1994).

Accordingly, when the switching operation is performed in response to the detection thereof, several seconds are required taking a VP AIS detection guard time into consideration. Thus, the switching operation is very slow.

Problems in the switching operation triggered by the VP PM are:

(1) Up to 30 VP PM cells are simultaneously monitored at maximum (GR-1248-CORE Issue 1, Bellcore August 1994). Thus, the objects to be switched are restricted in number to 30.

(2) The insertion of the VP PM cells is carried out at a rate of 1 cell/128 cells (depending upon the case, 1 cell/256 cells, 1 cell/512 cells, 1 cell/1024 cells) (GR-1248-CORE Issue 1, Bellcore August 1994). Therefore, switching by this approach requires a long switching time.

Problems in the switching operation in response to the switching message in the OAM cells are:

(1) Communication is required to transmit the message between nodes. This requires insertion of new OAM cells and complicated message processing for those OAM cells. As a result, a processing circuit has a corresponding increase in scale.

(2) Since the new QAM cells are inserted, these OAM cells are newly assigned to a transmission path band currently used. This may suppress the band allotted to the user cells. Generally, the number of bits required in generation of n cells for 4096 VP's is calculated by n×53×8×4096=n×1.7 Mbit.

In case of generation of n cells per one second, the band required is calculated as n×53×8×4096=n×1.7 Mbps.

(3) Delivery of the switching message requires message recognition and communication. This requires additional processing time which will result in slow switching.

The slow switching is considered as follows.

The insertion of VP PM cells prescribed in GR-1248-CORE is carried out at a rate of 1 cell/128 user cells. For low-frequency errors, small cell loss, and misinsertion, no trouble is caused if the switching operation takes a slightly longer time resulting in no serious influence imposed upon the application. On the other hand, upon occurrence of serious failure such as Line LOS, the switching operation must be performed as as soon as possible. Accordingly, a problem arises if the same approach is applied and the switching time is uniformly delayed.

The above-mentioned methods have critical disadvantages such as increased scale of the processing circuit related to the switching operation, longer processing time, suppression of the band allotted to the user cells, and slower switching.

SUMMARY OF THE INVENTION

It is therefore an object of this invention to provide a device and a method which is capable of transferring, in an ATM network, failure information as a switching reference at a high speed.

It is anther object of this invention to overcome various disadvantages including increase in scale of a processing circuit related to switching, a long processing time, and suppression a band allotted to user cells.

Other objects of this invention will become clear after reading the following description.

A node, to which this invention is applicable is used in an ATM (asynchronous transfer mode) network and is supplied with user cells. The node includes failure detecting section for detecting a failure which has occurred in the ATM network such that no user cell is supplied to the node.

According to a first aspect of this invention, the node comprises: band detecting means for detecting, as a detected band, a transmission path band used in transferring the user cells immediately before occurrence of the failure; and producing means connected to the failure detecting means and the band detecting means for producing, when the failure detecting means detects the failure, OAM (Operation: Administration and Maintenance) cells at a production rate increased within a range such that the detected band is not exceeded. The OAM cells are for use in transferring information indicative of occurrence of the failure.

According to a second aspect of this invention, the node comprises: band memorizing means for preliminarily memorizing, as a memorized band, a transmission path band used in transferring the user cells immediately before occurrence of the failure; and producing means connected to the failure detecting means and the band memorizing means for producing, when the failure detecting means detects the failure, OAM (Operation: Administration and Maintenance) cells at a production rate increased within a range such that the memorized band is not exceeded, the OAM cells being for use in transferring information indicative of occurrence of the failure.

A node to which a third aspect of this invention is applicable is for use in an ATM (asynchronous transfer mode) network and is supplied with a succession of monitoring objects which is one of a succession of VP's (Virtual Paths) and a succession of vC's (Virtual Channels). The node includes performance monitoring means for carrying out performance monitoring on a predetermined number of the monitoring objects among the succession of monitoring objects.

According to the third aspect of this invention, the node comprises: dividing means for dividing the succession of monitoring objects into a succession of object blocks, each object block comprising the predetermined number of the monitoring objects, the dividing means successively delivering the object blocks to the performance monitoring means.

A method to which a fourth aspect of this invention is applicable is for transferring information indicative of occurrence of a minor failure which is detected in a node of an ATM (asynchronous transfer mode) network and which is occurred in the ATM network such that user cells are allowed to continuously flow in the ATM network.

According to the fourth aspect of this invention, the method comprises the step of: using, in the node, bits of the user cells in transferring the information so that the information is informed without addition of new cells and without preventing communication of user information of the user cells.

A method to which a fifth aspect of this invention is applicable is for transferring information indicative of occurrence of a minor failure which is detected in a node (14) of an ATM (asynchronous transfer mode) network and which is occurred in the ATM network such that user cells are allowed to continuously flow in the ATM network.

According to the fifth aspect of this invention, the method comprises the step of: producing, in the node, new cells using a different transmission path band which is different from a transmission path band used in transferring the user cells, the new cells being for use in transferring the information.

DESCRIPTION OF THE PREFERRED EMBODIMENTS

Description will be first made as regards a principle of this invention.

Means for (2) and (3) of the "problems in the switching operation triggered by the VP AIS" as the Problems to be Solved by the Invention.

The insertion of the VP AIS as the OAM cells prescribed in GR-1248-CORE at least 500 msec before first insertion takes place. Subsequent insertion is carried out at the rate of 1 cell/1 second. Thus, the VP AIS has a low rate for use as the switching trigger. Upon occurrence of the failure, a significant amount of time is required to inform about the failure. Taking into account the detection guard time, several seconds will be required before switching can occur.

For example, consider the Line LOS case in which a line is cut off. The user cells flow before occurrence of the failure and, simultaneously when the failure occurs, the user cells no longer flow. Focusing this fact, it is believed that, if the band used for the user cells immediately before occurrence of the failure is used for the VP AIS, no adverse influence will be imposed upon other communication.

In view of the above, the VP AIS is inserted at the increased rate within the range such that the band assigned to the user cells before occurrence of the failure is not exceeded. Up to the band, no adverse influence will be imposed upon other communication even if the rate of the VP AIS is increased. By increasing the transmission rate of the VP AIS in the above-mentioned manner, occurrence of the failure is immediately informed. This enables quick switching.

Means for (1) of"Problems in the switching operation triggered by the VP PM" as the Problems to be Solved by the Invention Up to 30 VP PM cells are simultaneously monitored at maximum (GR-1248-CORE is sue 1, Bellcore August 1994). Thus, the objects to be switched are restricted in number to 30. In view of the above, means for successively and time-sequentially monitoring 30 VP's to be measured is additionally provided. Thus, by the use of 30 monitoring circuits, it is possible to monitor the PM cells for all the VP's.

Means for"all" of the Problems to be Solved by the Invention

According to this invention, notifying information such as the failure information or the switching information, is carried on the bits in the ATM user cells. Thus, information transmission is carried out without inserting any new cells.

For example, the bits in the user cells are VPI bits. The VPX is literally an identifier of the VP. For example, one bit is reserved and notification of the failure is carried out by the bit. If one bit of the VPI is used, the range of setting the VPI value is reduced to half. However, the VPI can be managed at a network side so that no problem in interoperability is caused.

As an alternative, CLP (Cell Loss Priority) bits are known. These bits are not only used to indicate the cell loss priority as its original object but also as a switching reference (switching trigger) in such a manner that a path with errors totaling more than a predetermined level is tagged (CLP=1) and switching is performed with reference to the result of monitoring of the CLP bits at a receiving end. It is noted here that the CLP bits are used in an ATM cell traffic control system to perform a loss priority function. These bits are used for the purpose of relieving, when congestion occurs in the network, more important cells as much as possible by preferentially discarding less important cells. CLP=1 and CLP=0 represent those cells that are easily discarded and more difficult to discard, respectively.

Figure 1:
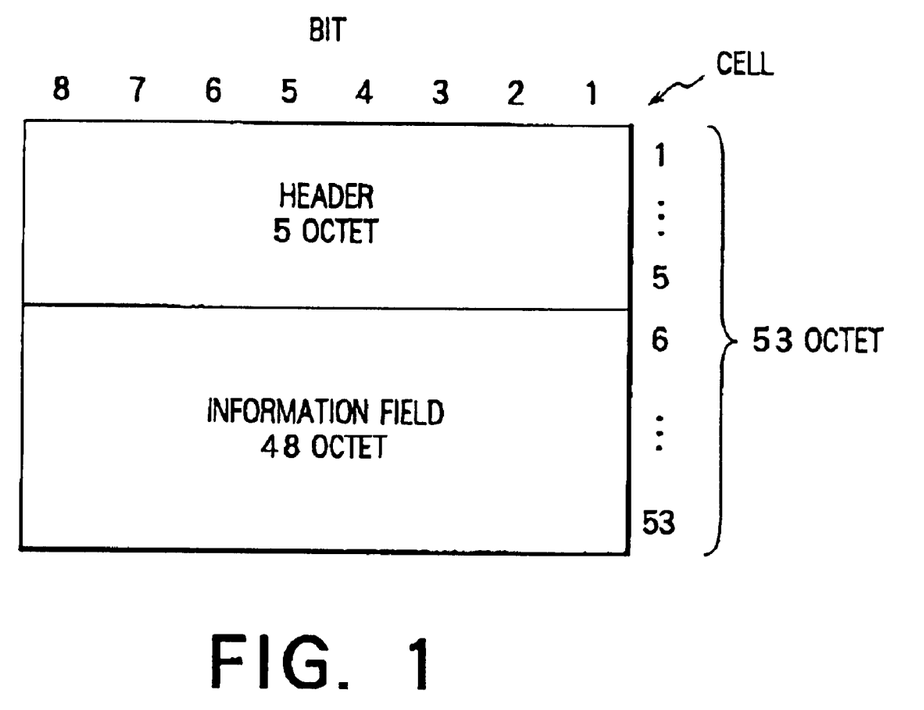
FIG. 1 is a view of an exemplary a structure of an ATM cell.
Figure 2:
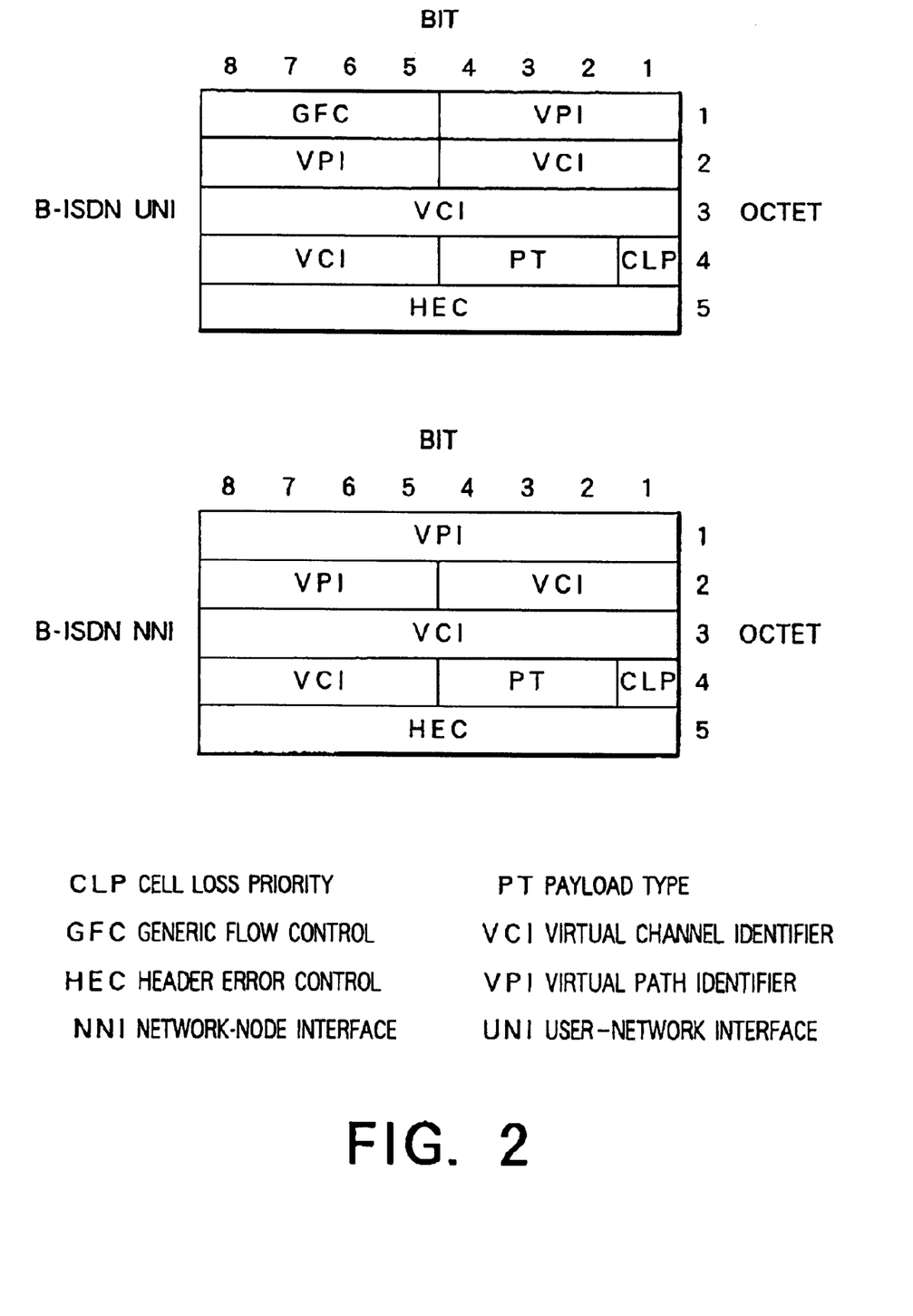
FIG. 2 is a view showing exemplary ATM cell headers.

FIG. 1 shows the structure of an ATM cell and FIG. 2 shows cell headers (positions of the CLP bits).

In the conventional methods, there are standing problems such as the suppression to the band of the user cells and the low transmission rate as far as the OAM cells, such as VP AIS and VP PM, are used. In addition, if generation of a large amount at the same time is desired, a processing load is very great for the OAM cells.

If the message is used in switching, the circuit for implementing the algorithm for message transmission becomes complicated in addition to the amount processing time that is required therefor. As a result, the switching operation inevitably takes a long time.

In view of the above, the bits contained in the user cells are used according to this invention. In this event, since the OAM cells are not used for switching, no suppression to the band of the user cells is caused. The information of one bit or more can be transmitted for one user cell so that the notification rate is very high. Since the location of the bit is fixed, transmission/detection by hardware is easy and implementation into an LSI is possible. Recognition of one bit in one cell is sufficient and no message transmission is required. Therefore, high-speed information transmission is possible and generation of a large amount of cells at the same time can be dealt with.

Now, description will be made about embodiments of this invention with reference to the drawing.

VP AIS Rate Adjustment

For example, in case of the occurrence of a Line LOS in which a line is cut off, immediate notification to a VP terminating point is desired. However, in the VP AIS insertion prescribed in GR-1248-CORE, it takes a long time to notify the termination point because the VPAIS insertion rate is low. Herein, focusing the fact that user cells flow before occurrence of the failure and the user cells no longer flow due to the failure, VP AIS cells as OAM cells are inserted instead of idle cells with an upper limit defined by a band used by the user cells before occurrence of the failure. Thus, no adverse influence is imposed on the other communication.

As mentioned above, it is possible to increase the rate of the VP AIS cells to the transmission rate of 1 cell/1 second or more within the range such that the band assigned to the user cells before occurrence of the failure is not exceeded. This makes it possible to quickly inform the terminating point of an occurrence of the failure and, as a result, to quickly perform a switching operation. The outline is illustrated in FIGS. 3 and 4.

Figure 3:
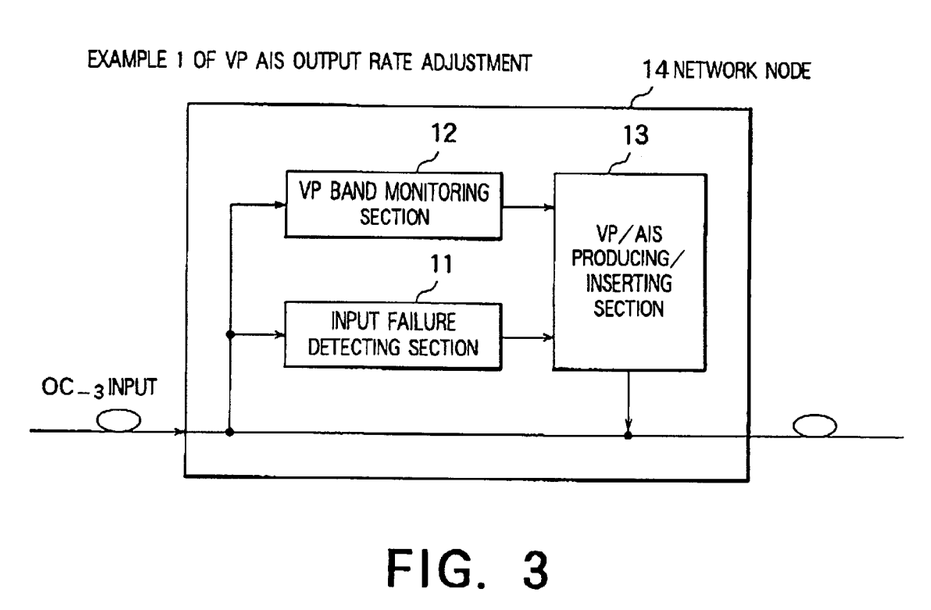
FIG. 3 is a block diagram of an ATM signal switching apparatus according to a first embodiment of this invention.
Figure 4:
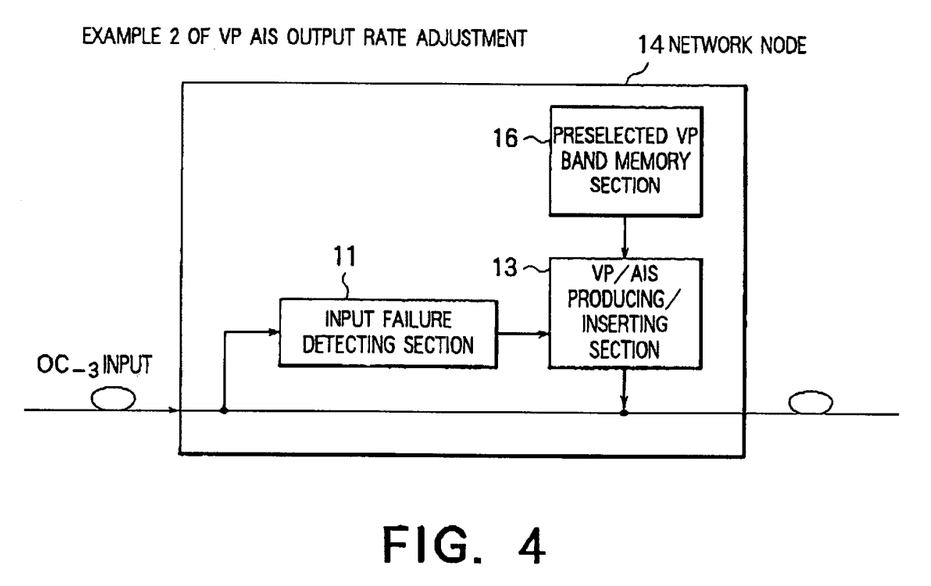
FIG. 4 is a block diagram of an ATM signal switching apparatus according to a second embodiment of this invention.

FIG. 3 shows an ATM signal switching apparatus according to a first embodiment of this invention. Referring to FIG. 3, description will be made about an example 1 of the rate adjustment of VP AIS output. As illustrated in the figure, a VP supplied as OC-3 input to a network node 14 is continuously monitored for its band by a VP band monitoring section 12. It is assumed here that an input signal is involved in an "input failure". In this event, an input failure detecting section 11 detects the failure and this information is transmitted to a VP AIS producing/inserting section 13. Simultaneously, the VP band measured at that time instant is input to the VP AIS producing/inserting section 13. In response to the information, the VP AIS producing/inserting section 13 produces a VP AIS and inserts the VP AIS.

Examples of the "input failure" in conjunction with the figure will be described. Like the following examples, this involves those failures in which the VP is completely cut off.

.LOS (Loss of Signal)

.LOF (Looss of Frame)

.Line AIS (Alarm Indication Signal)

.Path AIS (Alarm Indication Signal)

.Path LOP (Loss of Pointer)

.Path UNEQ (Unequipped Signal)

.Path TIM (Trace Identifier Mismatch)

.SLM (Signal Label Mismatch)

.LCD (Loss of Cell Delineation)

FIG. 4 shows an ATM signal switching apparatus according to a second embodiment of this invention. Referring to FIG. 4, description will be made about an example 2 of the rate adjustment of the VP AIS output. In the figure, it is assumed that an incoming VP has a band preliminarily set in a preselected VP band memory section 16. It is assumed here that an input signal is involved in an "input failure". In this event, an input failure detecting section 11 detects the failure and this information is transmitted to a VP AIS producing/inserting section 13. In accordance with the VP band set in the preselected VP band memory section 16, a VP AIS is produced and the VP AIS is inserted.

In each of FIGS. 3 and 4, it will be assumed that the input failure detecting section 11 of the network node 14 of a ATM network detects occurrence of a minor failure that has occurred in the ATM network such that user cells are allowed to continuously flow in the ATM network. In this event, the VP/AIS producing section 13 may produce new cells using a transmission path band different from a transmission path band which is used in transferring the user cells and which is delivered from either the VP band monitoring section 12 (FIG. 3) or the preselected VP band memory section 16 (FIG. 4). The new cells are for use in transferring the information. Thus, the network node 14 determines by band management a transfer band for the failure information so that a band of an existing signal is not affected by addition of the new cells.

PM Sequential Monitoring

It is defined that up to 30 VP PM's are simultaneously monitored at a maximum (GR-1248-CORE is sue 1, Bellcore August 1994). In this event, the VP's as objects to be switched are restricted to 30 in number. Therefore, by additionally providing means for successively and time-sequentially monitoring 30 VP's to be monitored, it is possible by the use of 30 monitoring circuits to monitor PM cells for all the VP's. By reducing PM items to be monitored to those essential in switching, an overall monitoring time can be shortened. Therefore, by the use of a simple circuit, it is possible to detect smaller VP errors, cell loss, and misinsertion and to perform the switch operation in response thereto.

Figure 5:
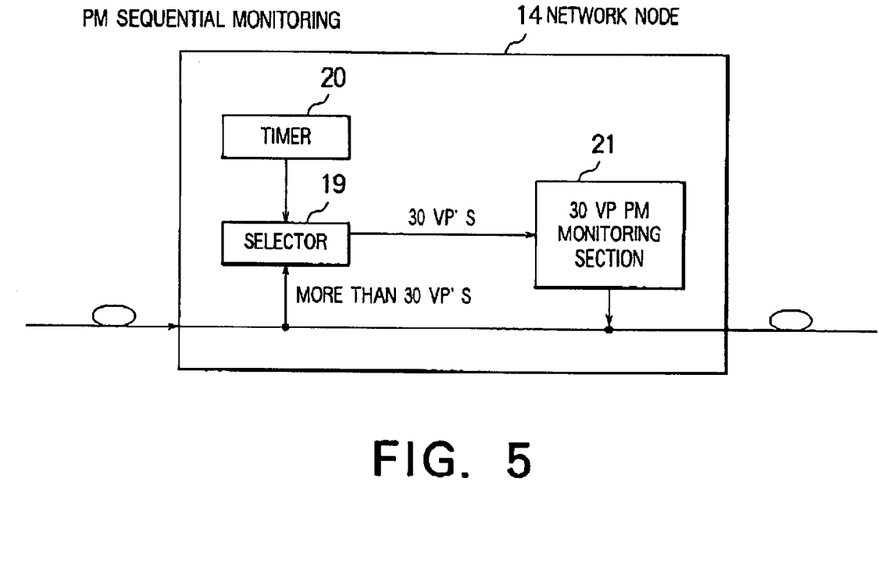
FIG. 5 is a block diagram of an ATM signal switching apparatus according to a third embodiment of this invention.

FIG. 5 shows an ATM signal switching apparatus according to a third embodiment of this invention. Referring to FIG. 5, an example of PM sequential monitoring will be described. As illustrated in the figure, all incoming VP's are at first supplied to a selector 19 in order to carry out PM monitoring. The selector 19 is for selecting 30 VP's among the incoming VP's. On the other hand, a timer 20 is provided to control the selection so that the 30 VP's currently selected are replaced by another 30 VP's at predetermined time intervals. Thus, by the use of a 30 VP PM monitoring section 21 having the 30 monitoring circuits, it is possible to monitor the PM cells for all the VP's.

Use of the Bits in the User Cells

Figure 6:
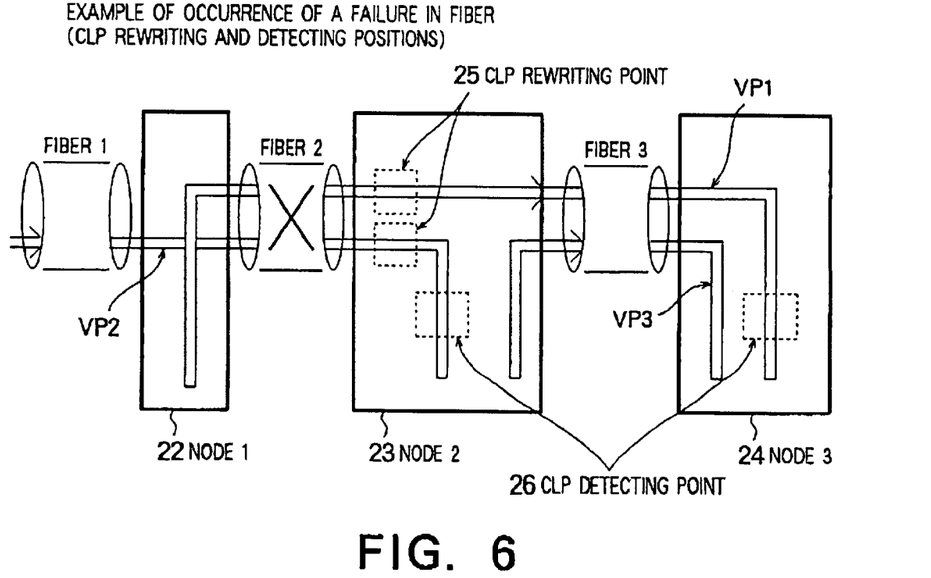
FIG. 6 is a block diagram of an ATM signal switching apparatus according to a fourth embodiment of this invention.

As an example, description will be made of a method of using, among the bits in the user cells, the CLP (Cell Loss Priority) bits at the user cell headers in transferring failure information when the minor failure occurs in the ATM network such that user cells are allowed to continuously flow in the ATM network. These bits are not only used to indicate the Cell Loss Priority as an original object of the CLP's but also as a switching reference (switching trigger) in such a manner that, upon occurrence of a failure in a particular VP or a superior layer to the particular VP, the CLP's of the particular VP are tagged (CLP=1) and switching is performed with reference to the result of monitoring of the CLP bits at a receiving end. FIG. 6 shows the outline.

FIG. 6 shows an ATM signal switching apparatus according to a fourth embodiment of this invention. Referring to FIG. 6, three nodes 22, 23, and 24 are labelled Node 1, Node 2, and Node 3, respectively. VP1, VP2, and VP3 are present as illustrated in the figure. It is assumed here that a fiber 2 is deteriorated due to some reason. In this event, each of VP1 and VP2 is affected thereby to cause an error to occur. Thus, these VP's themselves fall in a failed condition. In this case, deterioration of the fiber 2 is detected at a receiving side of Node 2. In response, the CLP's are written at a rewriting point 25 as shown in the figure (the method of rewriting will later be described). Each VP is transmitted to a next stage and the CLP's are detected at a terminating point (CLP detecting point 26). With reference to the CLP's, it is found out that the VP in question is subjected to the failure. In order to perform the switching operation not at the path terminating point but at one or a plurality of segments, the CLP's are monitored at every segment and switching is carried out correspondingly. Once the switching is performed, the CLP's are returned to their initial states to avoid propagation of switching to a subsequent stage and thereafter.

Since one CLP bit is contained in one user cell, the transmission rate is very high and the location is fixed. This facilitates transmission/detection by hardware. It is therefore possible to very easily carry out transmission/detection by hardware. Thus, failure notification is very easy and switching is very quick.

For example, switching is carried out as follows. In conjunction with the example in FIG. 6, it is assumed that a line error is produced at a repeater node (Node 2). Then, the CLP's in each of VP1 and VP2 involved therein are given "1". On the other hand, the CLP's of the VP's are continuously monitored at a terminating end. From the number of CLP=1 cells and the number of all cells in each VP, calculation is made of a ratio (CLP1 ratio) of the CLP=1 cells with respect to all the cells. In case where the same signal is supplied through a plurality of paths, comparison is made therebetween to judge a path having a highest reliability in correspondence to a lowest value of the "CLP1 ratio". The result of judgement is used as a switching reference (switching trigger).

As will be described in the following, an additional function is provided to select whether or not an original CLP scheme is maintained or inhibited.

1) Approach with the Original CLP Scheme Maintained

With the cell lose priority function as the original CLP scheme maintained, a switching-purpose CLP function is also provided. Thus, UPC violation tagged in the original CLP scheme can be an object of switching.

2) Approach with the Original CLP Scheme Inhibited

If the UPC violation tagged in the original CLP scheme is not desired to be the object of switching, the scheme is inhibited. The scheme is also inhibited in the following situation. In case where the CLP's in the VP in question are tagged (CLP=1), it is impossible to distinguish whether the CLP's have a value 1 in its original function or whether the CLP's are given 1 for the purpose of switching. Therefore, even the cells given a higher cell priority so as to be rarely discarded are lowered in the cell priority and tend to be discarded. In order to avoid the above, the cell loss priority function as the original CLP scheme is inhibited to avoid the discarding.

The above-mentioned problem can be dealt with also by preliminarily creating a network design such that no cell loss is caused to occur.

In the case of adopting a "method of carrying a message on CLP's themselves" which will later be described, the original CLP scheme must be inhibited.

Now, an example of application will be described.

(1) Method of Rewriting CLP's

At first, description will be made about where and how the CLP's are rewritten.

An example of rewriting the CLP's in the VP's in question will be described. Upon detection of failures, the CLP's in the VP's in question are rewritten (in case where ATM cells are mapped in a SONET frame). In order to increase a degree of freedom, it is possible to allow selection whether or not rewriting is individually carried out.

.B1 BIP (Bit Interleaved Parity) Error Rate not smaller than a predetermined threshold value .B2 BIP Error Rate not smaller than a predetermined threshold value .B3 BIP Error Rate not smaller than a predetermined threshold value .CRC (Cyclic Redundancy Check) Error Rate not smaller than a predetermined threshold value .VP AIS (Virtual Path Alarm Indication Signal)

.LVPC (Loss of VP Continuity)

.VPPM (VP Performance Monitoring) not smaller than a predetermined threshold value .VPTIM (VP Trace Identifier Mismatch)

.Rate of CLP=1 not smaller than a predetermined threshold value

.VC AIS (Virtual Channel Alarm Indication Signal)

.LVCC (Loss of VC Continuity)

.VCPM (VC Performance Monitoring) not smaller than a predetermined threshold value .VCTIM (VC Trace Identifier Mismatch)

.Rate of CLP=1 not smaller than a predetermined threshold value

"Not smaller than a predetermined threshold value" means that the threshold value in judgment of rewriting is selectable.

In the following cases, a reception signal itself can not be recognized at all and the VP is interrupted thereat Therefore, the CLP's need not be rewritten as far as a continuous VP is not generated. Instead, in the case where the CLP's of the VP in question can not be recognized at the VP terminating point, the VP in question becomes an object of switching as will later be described.

.LOS (loss of Signal)

.LOF (Loss of Frame)

.Line AIS (Alarm Indication Signal)

.Path AIS (Alarm Indication Signal)

.Path LOP (Loss of Pointer)

.Path UNEQ (Unequipped Signal)

.Path TIM (Trace Identifier Mismatch)

.SLM (Signal Label Mismatch)

.LCD (Loss of Cell Delineation)

Next, description will be made about a method of rewriting the CLP's of the VP in question.

1) Method of Giving 1 to All CLP's (Tagging)

As described above, upon occurrence of the failure in the particular VP or the superior layer to the particular VP, all CLP's of the VP in question are tagged (CLP=1) throughout a time period of occurrence of the failure. This method is simplest and the circuit is easily realized.

2) Method of Giving Alternation of 0 and 1 to the CLP's

In the method 1), it is impossible to distinguish whether the CLP's have a value 1 in their original function or whether the CLP's are given 1 for the purpose of switching. Therefore, those cells that are rarely desired to be subjected to cell loss may be reduced in cell priority to CLP=1 by a tagging error and thus subjected to cell loss in an intermediate node. In order to avoid this, the original CLP scheme is inhibited or the network design is preliminarily determined so that no cell loss occurs, as described above. Herein, another method is proposed.

In case where a failure occurs in a particular VP or a superior layer to the particular VP, 1 and 0 are alternately inserted to the CLP's of the VP in question throughout a time period of occurrence of the failure. As will later be described, it is possible to reduce the probability of change of the cell from its original value of CLP=0 into CLP=1. In contrast, the cell having an original value of CLP=1 can be changed into CLP=0.

Figure 7:
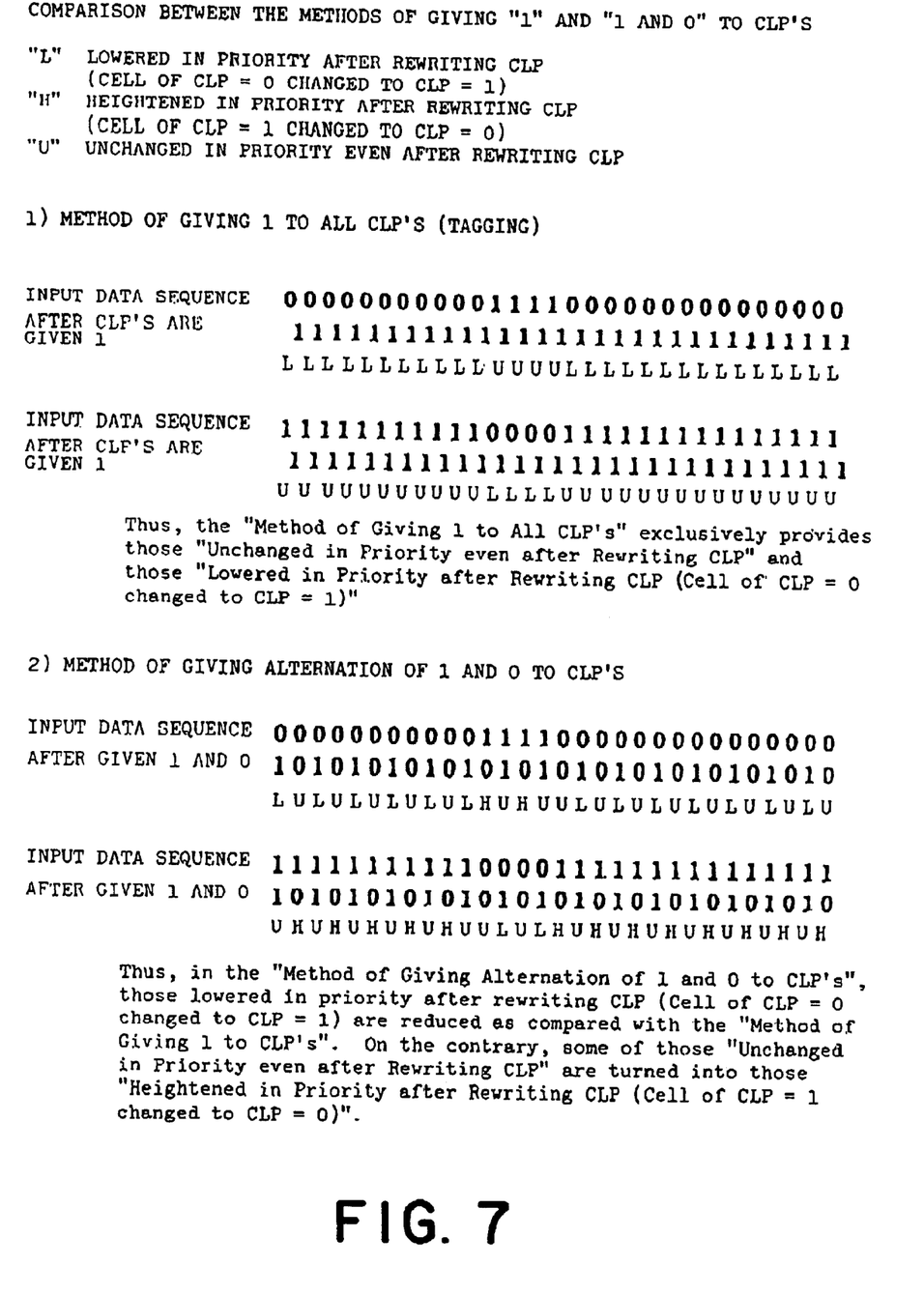
FIG. 7 is a view of an exemplary comparison between methods of giving "1" and "1 and 0" to CLP's.

The foregoing is collectively shown in FIG. 7.

3) Method of Carrying the Message on the CLP's Themselves As described above, since one CLP bit is contained in one user cell, the transmission rate is very high and the location is fixed so that transmission/detection by hardware is facilitated. In this connections, proposal is made of a method of carrying the message by the use of a plurality of the CLP bits. Since one message is transmitted on a plurality of ATM cells, transmission and reception can not be performed as fast as 1) and 2) but some content such as a failure level (a critical failure or a suspendible failure) can be transmitted. In this case, the original CLP scheme must be inhibited.

(2) Method of Monitoring the CLP's

The CLP's (Cell Loss Priority) at the ATM user cell headers are monitored at the VP terminating point to detect the contents thereof.

As one method, the ratio of CLP=1 with respect to all cells is monitored. This method can be used in monitoring in case where the CLP's are rewritten in the "Method of Giving 1 to All CLP's (Tagging)" described above. Specifically, if the failure occurs in the particular VP or the superior layer to the particular VP, all CLP's of the VP in question are tagged (CLP=1) throughout the period of occurrence of the failure. Therefore, by monitoring the ratio of CLP=1, the degree of failure of the VP is detected.

Figure 8:
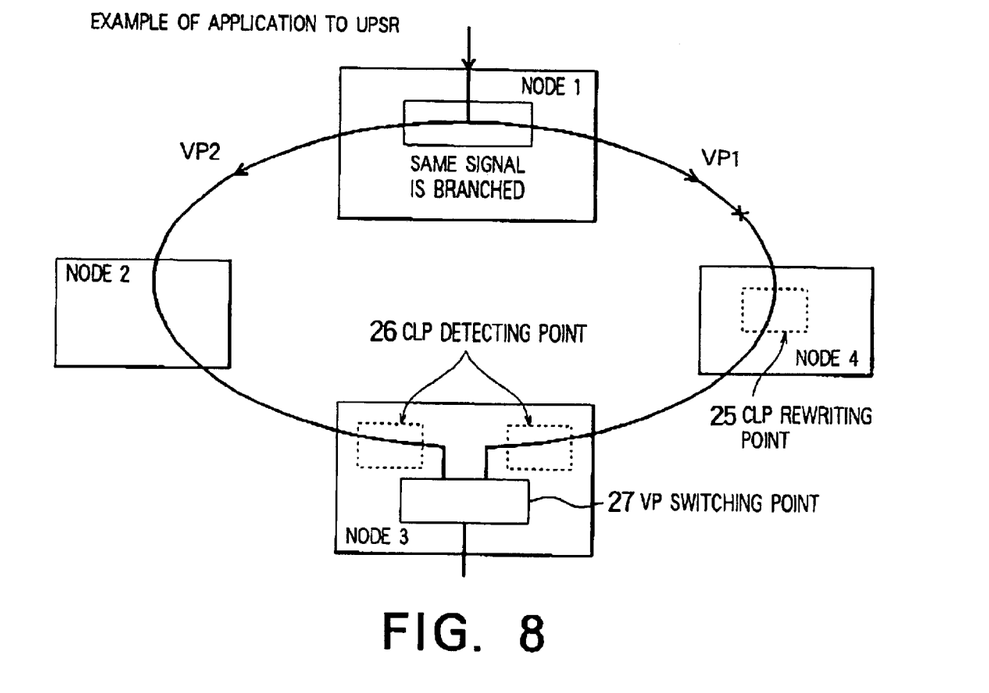
FIG. 8 is a view of an example in which this invention is applied to UPSR.
Figure 9:
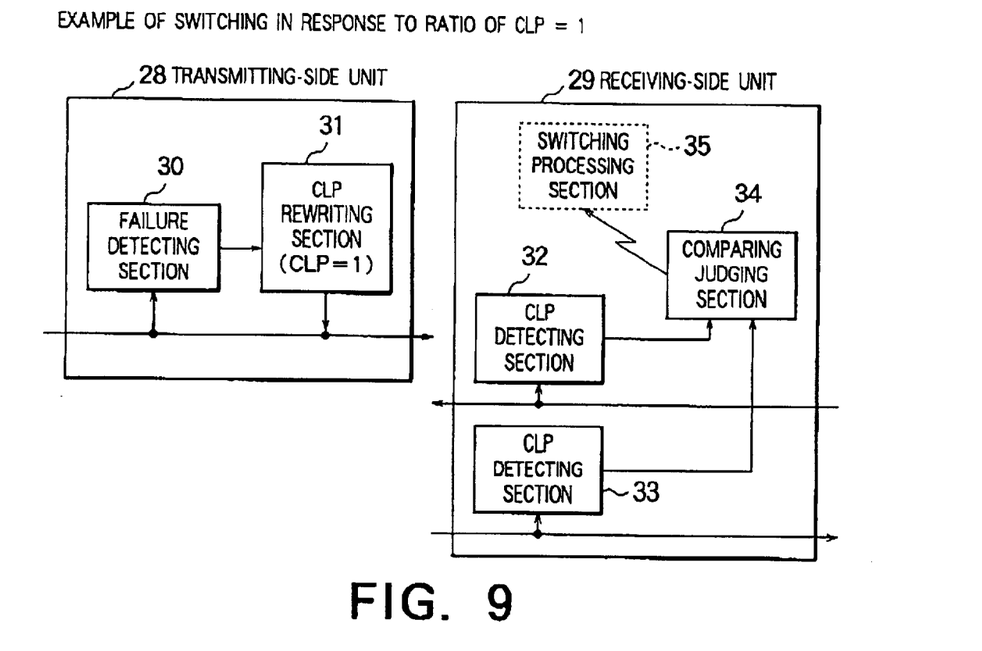
FIG. 9 is a view of an example of switching with reference to the ratio of CLP=1 according to this invention.

If the above-mentioned method is applied to an alternative switching system such as UPSR, switching is very simply realized. FIGS. 8 and 9 show the outline.

For example, in FIG. 8. the same signal is branched into VP1 and VP2. It is assumed here that a fiber between a node 1 and a node 4 in the course of VP1 is deteriorated. In this event, CLP's of the VP1 is rewritten in the node 4 at a CLP rewriting point 25. On the other hand, a terminating node 3 is supplied with the same signal VP2 through a different path. At CLP detecting points 26, the CLP's of the VP1 and the VP2 are continuously monitored. The ratios of CLP=1 with respect to all cells are continuously compared. When the difference in ratio exceeds a predetermined value, VP switching is carried out at a VP switching point 27. In the figure, switching from the VP1 to the VP2 is carried out.

It is noted here that the VP's supplied via the different paths are different in number of the arriving cells during a preselected period. Therefore, the ratio must be monitored at least for a duration such that comparison is possible.

Referring to FIG. 9, a transmitting-side unit 28 comprises a failure detecting section 30 for detecting a failure of a user cell VP, and a CLP rewriting section 31 for inserting "1" into CLP's of the user cell VP in question during a time period in which the failure detecting section 30 detects the failure and for outputting the VP. The transmitting-side unit 28 is equivalent in function to the node 4 in FIG. 8 while a receiving-side unit 29 is equivalent to the node 3 in FIG. 8. Specifically, the receiving-side unit 29 comprises CLP detecting sections 32 and 33 for detecting the CLP's of the user cells in order to perform the operation at the CLP detecting point 26 in FIG. 8, and a comparing judging section 34 and a switching processing section 35 in order to perform the operation at the VP switching point 27 in FIG. 8. The comparing judging section 34 compares the ratios of CLP=1 in the outputs of the CLP detecting sections 32 and 33 and delivers a VP switching signal to the switching processing section 35 when the difference in ratio exceeds a preselected value.

Alternatively, the frequency of change of CLP=0 and 1 is monitored at the receiving side. This method can be used in monitoring in case where the CLP's are rewritten in the "Method of Giving Alternation of 1 and 0 to the CLP's" described above. Specifically, if the failure occurs in the particular VP or the superior layer to the particular VP, alternation of 1 and 0 are inserted to the CLP's of the VP in question during a time period of occurrence of the failure. Therefore, by monitoring the frequency of change of CLP=0 and 1, the degree of failure of the VP is detected.

Figure 10:
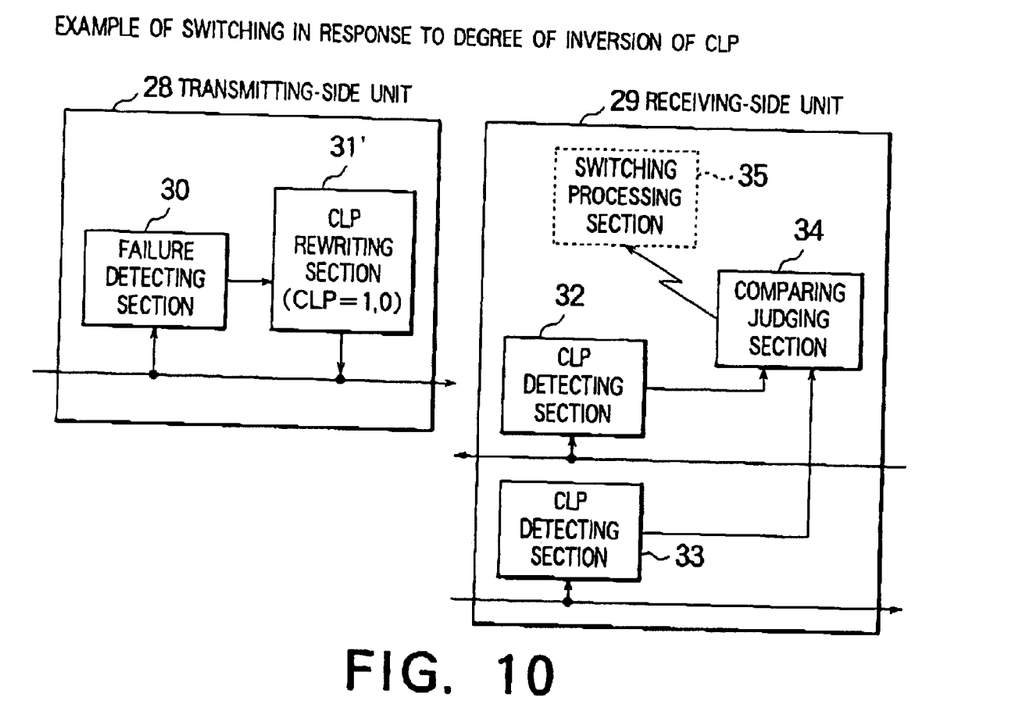
FIG. 10 is a view of an example of switching with reference to the degree of inversion according to this invention.

Let the above-mentioned method be applied to the alternative switching system such as UPSR. For example, the CLP's of the VP's supplied through the different paths are continuously monitored and the frequency of change of CLP=0 and 1 is continuously compared at the receiving side. When the difference in ratio exceeds a preselected value, switching is performed. FIG. 10 shows the outline. The concept on the network is similar to FIG. 8. Referring to FIG. 10, a CLP rewriting section 31' alternately inserts "1" and "0" to the CLP's during the time period of detection of the failure.

It is noted here that the VP's supplied via the different paths are different in number of the arriving cells during a preselected period. Therefore, the ratio must be monitored at least for a duration such that comparison is possible.

Alternatively, a message using a plurality of CLP bits is monitored at the receiving side. This method can be used in monitoring in case where the CLP's are rewritten in the"Method of Carrying a Message on the CLP's Themselves" described above. Specifically, one message is transmitted by a plurality of ATM cells (herein, the original CLP scheme must be inhibited). Thus, some content such as a more detailed failure level (a critical failure or a suspendible failure) can be transmitted.

(3) Switching Judgement and Switching

Switching judgement includes relative comparison-based judgement and absolute judgement.

1) Relative Comparison-Based Judgement

This is a switching technique based on comparison of the CLP's of a plurality of VP's. The alternative switching system such as UPSR mentioned above is a typical one. The CLP's of a plurality of candidate VP's, two or more, are continuously monitored. The ratio of CLP=1 with respect to all cells, the frequency of change of CLP=0 and 1, and the message transmitted by a plurality of the CLP's (message indicative of a level such as a critical failure or a suspendible failure) are continuously recognized determined and compared. By the comparison, a most reliable VP is selected among the selected VP's and switching thereinto is performed.

The alternative switching system will be explained. The ratios of CLP=1 with respect to all cells are continuously compared. When the difference in ratio of CLP=1 of two VP's exceeds a preselected value (for example, 20%), this constitutes a switching trigger. Alternatively, the frequency of change of CLP=0 and 1 is monitored. When the difference in frequency of change exceeds a preselected value (for example, 10 times/1 msec), this constitutes a switching trigger. Alternatively, when the messages using a plurality of CLP bits indicate one as a critical failure and the other as a suspendible failure, switching into the VP with suspendible failure is performed.

Before judgement of switching, it is noted that the VP's supplied through the different paths are different in number of arriving cells during a preselected period. With regard to a single VP, errors may occur in the CLP's in the cells due to deterioration of an optical cable in the course of the path. This may result in bit inversion or cell loss. Therefore, it is necessary to provide a "guard" such that monitoring of the CLP's is continued at least for a time duration which enables comparison.

2) Absolute Judgement

This method does not rely upon the comparison between the VP's but carries out switching when a preselected threshold value is exceeded. For this purpose, the CLP's are continuously monitored to determine the ratio of CLP=1 with respect to all cells, the frequency of change of CLP0 and 1, and the message transmitted by a plurality of the CLP's (message indicative of a level such as a critical failure or a suspendible failure). For example, the ratio of CLP=1 with respect to all cells is continuously monitored. When the ratio of CLP=1 exceeds a predetermined value (for example, 80%), the VP in question is judged as an object of switching and switched to a preliminarily prepared VP. Alternatively, the frequency of change of CLP=0 and 1 is monitored. When the frequency of change exceeds a predetermined value (for example, 10 times/1 msec), the VP in question is judged as an object of switching and switched to a preliminarily prepared VP. Alternatively, occurrence of the failure is communicated by the message comprising a plurality of the CLP bits, the VP in question is judged as an object of switching and switched to a preliminarily prepared VP.

Before judgement of switching, it is noted that the VP's supplied through the different paths are different in number of arriving cells during a preselected period. With regard to a single VP, errors may occur in the CLP's in the cells due to deterioration of an optical cable in the course of the path. This may result in bit inversion or cell loss. Therefore, it is necessary to provide a "guard" such that monitoring of the CLP's continued at least for a time duration which enables comparison.

The foregoing is directed to the case where the CLP bits supplied from a preceding stage are recognizable. When the CLP's from the preceding stage are not recognizable, the reception signal itself can not be determined so that the CLP's need not be rewritten. Instead, when the CLP's of the VP in question can not be recognized at the VP terminating point, the VP is selected as an object of switching immediately after lapse of a switching guard time.

Examples of the case where the CLP's supplied from the preceding stage can not be recognized are as follows. If these events occur at a repeating point or a terminating point of the VP, the CLP's can not be recognized.

.LOS (Loss of Signal)
.LOF (Loss of Frame)
.Line AIS (Alarm Indication Signal)
.Path AIS (Alarm Indication Signal)
.Path LOP (Loss of Pointer)

.Path UNEQ (Unequipped Signal)
.Path TIM (Trace Identifier Mismatch)
.SLM (Signal Label Mismatch)
.LCD (Loss of Cell Delineation)

Thus, in this system, two factors are considered as the switching trigger. One is obtained from monitoring of the content of the CLP's and the other is obtained from monitoring of the CLP's themselves. Specifically, 1. Switching based on the number of arriving cells during a certain monitoring period
   (in absence of arriving cells for a predetermined time period, switching is performed at that time instant)
2. Switching based on the ratio of switching CLP cells in the arriving cells
   (switching is performed by the ratio of those cells having the CLP's indicative of switching with respect to the arriving cells)

(4) Problems with the CLP's

1. The method using the CLP's is effective in case where a large number of errors do not occur in the network (upon occurrence of too many errors, accurate judgement is impossible). However, probability of bit inversion or cell loss due to occurrence of errors in the CLP's in the cells can not be eliminated. As described above, the countermeasures are:
   1) Errors are dealt with at an application level.
   2) The PM in which CLP errors or cell loss can be recognized is monitored and used as a switching trigger. In this case, it is allowed that monitoring takes a slightly long time.
2. This method is effective in case where a great amount of cell loss does not occur in the network (upon occurrence of too much cell loss, accurate judgement is impossible). However, even if a great amount of cell loss does not occur, those cells desired to be rarely subjected to cell loss may be tagged and thus preferentially discarded. As described above, the countermeasures are:
   1) The discard is dealt with at an application level.
   2) The original CLP scheme is inhibited.
   3) The network design is made such that no cell loss basically occurs.
   4) The PM in which cell loss is recognized is monitored and used as a switching trigger. In this case, it is tolerated that monitoring takes a slightly longer time.

In both of 1 and 2, the problems can be avoided by monitoring the PM and by performing the switching operation based thereupon. This will be described in the following "Combination thereof".

Although the examples using the CLP bits have been described so far, the bits in the user cells further includes each of GFC, VPI, VCI, PT, HEC at an overhead portion. In addition, there is a payload portion. For those bits, notification can be carried out in a concept similar to that described in the foregoing.

As another example of use of the bits, one bit of the VPI is reserved and notification of the failure is carried out by the bit. In this event, the range of setting the VPI value is reduced to half. However, the VPI can be managed at a network side so that no problem in interoperability is caused.

Alternatively, use can be made of the payload portion upon occurrence of HEC errors. Specifically, upon occurrence of the HEC errors, a cell in question as a whole is judged to lack reliability. By replacing the information in the payload portion, desired notification information is delivered.

Thus, use of the bits in the user cells includes various manners

"Combination thereof"

The above-mentioned methods are summarized as follows.

1. VP AIS Rate Adjustment

It is simple although detection is slow. Incorporating the transmission at a rate higher than 1 cell/1 second of this invention, faster transmission is possible.

2. PM Sequential Monitoring

Restriction in number to 30 is imposed and detection is slow. By the use of sequential monitoring of this invention, the restriction in number to 30 is cancelled. Monitored items cover the details so that errors, cell loss, and misinsertion can be monitored.

3. Use of the Bits in the User Cells

High speed. Easy in implementation by hardware. Simple. No band suppression because no OAM cells are used. However, weak upon occurrence of bit errors and cell loss.

These are merits and demerits. Accordingly, by the use of a combination thereof, characteristics can be supplemented by each other.

By the use of the combined method, the errors, the cell loss, and the misinsertion can be dealt with while, upon occurrence of a hardware failure such as a line failure, the OAM cells are inserted with the band controlled and the switching operation is carried out. Upon occurrence of the software failure such as errors, the bits in the user cells are used to carry out the switching operation.

As described above, according to this invention:

1. By the use of the VP AIS rate adjustment, the VP AIS can be inserted at an increased rate within a range such that the band assigned to the user cells before occurrence of a failure is not exceeded. Thus, by increasing the transmission rate of the VP AIS, the failure can be immediately notified so that switching is quickly performed.

2. By the use of the PM sequential monitoring, monitoring of the PM for all VP's is possible by the use of 30 monitoring circuits as means for successively and time-sequentially monitoring. Traditionally, up to 30 VP PM's are simultaneously monitored at maximum. Thus, the circuit is simplified and the monitored items cover the details so that errors, cell loss, and misinsertion can be monitored and switching based thereon is enabled.

3. As far as the OAM cells such as VP AIS or VP PM are used, there are standing problems including suppression to the band of the user cells and low transmission rate. If a large amount of and simultaneous generation is desired, the processing load is extremely large when the OAM cells are used. If the message is used for switching, the circuit realizing the algorithm for message transmission is complicated and the processing time therefor is required. As a result, switching takes a long time. As a consequence, in these methods, the processing circuit is increased in scale and processing time is long in connection with the switching operation. Thus, switching is slow.

If the bits in the user cells are used here, very high transmission rate is achieved because at least one bit information can be notified per one user cell. Recognition of several bits/1 cell is sufficient. Message transmission is no longer necessary. Thus, high-speed information transmission is possible. A large amount of and simultaneous generation is possible.

How fast the information is transmitted is as follows:

1. For example, the detection standard in SONET STS-Path AIS is to monitor a series of three H1H2. H1H2 appears once per STS frame of 125 usec. Therefore, monitoring of a series of three of them requires 125 usec×3=375 usec.

2. The detection standard in SONET VT AIS is to monitor a series of three V1V2. V1V2 appears once per VT superframe of 500 usec. Therefore, monitoring of a series of three of them requires 500 usec×3=1500 usec.

3. As regards detection of the ATM VP AIS, transmission of the VP AIS itself is 1 cell/second. Taking the guard time for detection, several seconds are required.

On the other hand, in detection of the user cells, the cells are supposed to be sequentially supplied at 155.52 Mbps. Since one cell is supplied in 3 usec, detection is possible in 300 usec even with the guard of 10 cells.

Since the bits in the user cells are fixed in position, transmission/detection by hardware is easy. Therefore, implementation into an LSI is expected and switching is achieved with a small size, a low cost, and a low power consumption. As compared with the method using the OAM cells for switching, no band suppression upon the user cells occurs.

By the use of the above-mentioned combination, merits and demerits can be supplemented by each other.

What is claimed is:

1. A node for use in an ATM (asynchronous transfer mode) network and supplied with user cells, said node including a failure detector for detecting a failure that has occurred in said ATM network such that no user cells are supplied to said node, said node comprising:

a band monitor for detecting a transmission path band used in transferring said user cells immediately before occurrence of said failure; and producing means connected to said failure detector and said band monitor for producing, when said failure detector detects said failure, OAM (Operation Administration and Maintenance) cells within said detected band at a production rate not exceeding said band, said OAM cells transferring information indicative of the occurrence of said failure.

2. A node for use in an ATM (asynchronous transfer mode) network supplied with user cells, said node including a failure detector for detecting a failure that has occurred in said ATM network such that no user cells are supplied to said node, said node comprising:

a band memory storing, as a memorized band, a transmission path band used in transferring said user cells immediately before occurrence of said failure; and producing means, connected to said failure detector and said band memory, for producing, when said failure detector detects said failure, OAM (Operation Administration and Maintenance) cells within said memorized band at a production rate not exceeding said memorized band, said OAM cells transferring information indicative of the occurrence of said failure.

* * * * *